United States Patent
Gerards et al.

(10) Patent No.: US 10,145,310 B2
(45) Date of Patent: Dec. 4, 2018

(54) FLAP DEVICE FOR AN INTERNAL COMBUSTION ENGINE

(71) Applicant: PIERBURG GMBH, Neuss (DE)

(72) Inventors: Hans Gerards, Gangelt (DE); Andreas Grauten, Krefeld (DE); Juergen Michels, Moenchengladbach (DE); Tim Holler, Toenisvorst (DE); Kirill Klass, Essen (DE)

(73) Assignee: PIERBURG GMBH, Neuss (DE)

( * ) Notice: Subject to any disclaimer, the term of this patent is extended or adjusted under 35 U.S.C. 154(b) by 69 days.

(21) Appl. No.: 15/300,783

(22) PCT Filed: Feb. 19, 2015

(86) PCT No.: PCT/EP2015/053472
§ 371 (c)(1),
(2) Date: Sep. 30, 2016

(87) PCT Pub. No.: WO2015/149989
PCT Pub. Date: Oct. 8, 2015

(65) Prior Publication Data
US 2017/0030269 A1 Feb. 2, 2017

(30) Foreign Application Priority Data

Apr. 1, 2014 (DE) .......................... 10 2014 104 579

(51) Int. Cl.
*F01N 3/00* (2006.01)
*F02D 9/06* (2006.01)
(Continued)

(52) U.S. Cl.
CPC ............... *F02D 9/06* (2013.01); *F02D 9/101* (2013.01); *F02D 9/106* (2013.01); *F02M 26/54* (2016.02); *F16K 1/224* (2013.01); *F16K 1/2268* (2013.01)

(58) Field of Classification Search
CPC F02D 9/06; F02D 9/101; F02D 9/106; F02M 26/54; F16K 1/224
See application file for complete search history.

(56) References Cited

U.S. PATENT DOCUMENTS 5,148,678 A 9/1992 Ueda et al.
6,079,210 A 6/2000 Pintauro et al.
(Continued)

FOREIGN PATENT DOCUMENTS

DE 10 2004 046 077 A1 4/2006
DE 10 2004 062 924 A1 7/2006
(Continued)

*Primary Examiner* — Audrey K Bradley
*Assistant Examiner* — Anthony Ayala Delgado
(74) *Attorney, Agent, or Firm* — Norman B. Thot

(57) ABSTRACT

A flap device for an internal combustion engine includes a flow housing which delimits a flow duct, a shaft which rotates and which is supported on one side thereof, a flap body attached to the shaft in the flow duct, an actuator which rotates the shaft and thereby the flap body, an actuator housing having the actuator arranged therein, a first bearing seat formed on the flow housing, a first bearing arranged in the first bearing seat to radially surround the shaft, a second bearing, a chamber which surround the shaft, and a bore arranged to open into the flow duct from the chamber. The shaft protrudes into the actuator housing. The shaft is supported on the one side via the first bearing and via the second bearing. The chamber from which the bore opens into the flow duct is arranged between the first bearing and the second bearing.

9 Claims, 2 Drawing Sheets

(51) Int. Cl.
*F02D 9/10* (2006.01)
*F16K 1/22* (2006.01)
*F16K 1/226* (2006.01)
*F02M 26/54* (2016.01)

(56) References Cited

U.S. PATENT DOCUMENTS

| | | | |
|---|---|---|---|
| 6,135,415 A * | 10/2000 | Kloda | F02M 26/21 123/568.18 |
| 6,505,643 B2 | 1/2003 | Scholten et al. | |
| 7,024,852 B2 | 4/2006 | Trapp | |
| 7,503,544 B2 * | 3/2009 | Unbehaun | F02D 9/04 251/214 |
| 2006/0059902 A1 | 3/2006 | Gerards et al. | |
| 2007/0240676 A1 | 10/2007 | Sasaki | |
| 2007/0240677 A1 | 10/2007 | Sasaki | |
| 2009/0265084 A1 | 10/2009 | Enomoto | |
| 2009/0317031 A1 | 12/2009 | Pfundt et al. | |
| 2012/0248353 A1 | 10/2012 | Furukawa et al. | |
| 2012/0325183 A1 | 12/2012 | Hatano | |
| 2013/0001882 A1 | 1/2013 | Voigtlaender et al. | |
| 2013/0167815 A1 | 7/2013 | Bareis | |
| 2013/0313460 A1 | 11/2013 | Kobayashi | |
| 2015/0226161 A1 | 8/2015 | Bareis et al. | |

FOREIGN PATENT DOCUMENTS

| | | |
|---|---|---|
| DE | 10 2007 000 221 A1 | 11/2007 |
| DE | 603 11 395 T2 | 11/2007 |
| DE | 10 2006 043 559 A1 | 3/2008 |
| DE | 10 2006 048 713 A1 | 4/2008 |
| DE | 10 2006 053 716 A1 | 5/2008 |
| DE | 10 2008 001 834 A1 | 11/2008 |
| DE | 10 2009 011 951 A1 | 9/2010 |
| DE | 10 2010 006 023 A1 | 7/2011 |
| DE | 10 2011 000 101 A1 | 7/2012 |
| DE | 10 2012 204 863 A1 | 10/2012 |
| DE | 10 2012 210 468 A1 | 12/2012 |
| DE | 10 2013 209 755 A1 | 11/2013 |
| EP | 0 972 918 A2 | 1/2000 |
| EP | 1 291 509 A2 | 3/2003 |
| EP | 1 426 589 A2 | 6/2004 |
| EP | 1 911 958 A1 | 4/2008 |
| EP | 2 372 136 A2 | 10/2011 |
| EP | 2 597 294 A2 | 5/2013 |
| JP | 7-238871 A | 9/1995 |
| JP | 11-257104 A | 9/1999 |
| JP | 2012-57547 A | 3/2012 |
| WO | WO 2006/003017 A1 | 1/2006 |

* cited by examiner

FLAP DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2015/053472, filed on Feb. 19, 2015 and which claims benefit to German Patent Application No. 10 2014 104 579.3, filed on Apr. 1, 2014. The international Application was published in German on Oct. 8, 2015 as WO 2015/149989 A1 under PCT Article 21(2).

FIELD

The present invention relates to a flap device for an internal combustion engine, comprising a flow housing which delimits a flow duct, a flap body which is arranged rotatably in the flow duct, a shaft which is supported on one side and on which the flap body is fastened, a first bearing which is arranged in a first bearing seat and which radially surrounds the shaft, an actuator via which the shaft and the flap body can be rotated in the flow duct, an actuator housing in which the actuator is arranged, and a bore which opens into the flow duct from a chamber which surrounds the shaft.

BACKGROUND

Flap devices of this type are used, for example, as exhaust back flaps or exhaust return valves in low-pressure or high-pressure exhaust circuits, or as throttle flaps in the suction duct of internal combustion engines. They serve to control an exhaust quantity to be returned to the cylinders, to control the pressure in the exhaust return duct so as to reduce the pollutant emission of the engine, or to control quantity of air sucked.

Such valves are subjected to considerable stresses depending on their installation site both with regard to the incurred quantity of pollutants and with regard to prevailing temperatures. High thermal stresses on the actuators and the bearings and a risk of jamming or damage of the bearings due to contamination in the exhaust occur particularly in valves arranged in the exhaust section.

In order to avoid such damage caused by deposits on the shaft. EP 1 426 589 A2 describes a flap device supported on one side, wherein, internally of the housing and upstream of the bearing when viewed in the flow direction, a chamber is formed which, via a bore, is connected to the flow duct on the downstream side of the flap. The bearing in this arrangement is not, however, protected from the formation of ice in the switched-off state of the internal combustion engine.

EP 2 372 136 A2 describes an exhaust flap supported on both sides, wherein the side of the exhaust flap facing away from the actuator is supported in a closed plastic sleeve, the plastic sleeve having a recess formed in it which, via a bore in the flow housing, is connected to the flow duct so as to protect the shaft from formation of ice or other deposits. Such an arrangement is not however, suited for thermally highly stressable carbon-graphite bearings due to the recess in the support itself. Such an arrangement is not provided on the opposite side facing toward the actuator because this would lead to a thermal overload of the actuator.

Known arrangements thus have the disadvantage that no reliable protection against damage caused by formation of ice exists while simultaneously achieving thermal stress resistance in a flap device comprising a shaft extending into the actuator housing.

SUMMARY

An aspect of the present invention is to provide a flap device for an internal combustion engine wherein functional safety exists both in case of high thermal stress and in case of ambient temperatures below the freezing point. An aspect of the present invention is in particular the protection of the actuator from overheating by the intrusion of exhaust, and to avoid damage to the bearings due to the formation of ice in the switched-off state of the an internal combustion engine.

In an embodiment, the present invention provides a flap device for an internal combustion engine which includes a flow housing configured to delimit a flow duct, a shaft configured to rotate, the shaft being supported on one side thereof, a flap body attached to the shaft in the flow duct, an actuator configured to rotate the shaft and thereby the flap body in the flow duct, an actuator housing configured to have the actuator be arranged therein, a first bearing seat formed on the flow housing, a first bearing arranged in the first bearing seat so as to radially surround the shaft, a second bearing, a chamber configured to surround the shaft, and a bore arranged to open into the flow duct from the chamber. The shaft is configured to protrude into the actuator housing. The shaft is supported on the one side via the first bearing and via the second bearing. The chamber from which the bore opens into the flow duct is arranged between the first bearing and the second bearing.

BRIEF DESCRIPTION OF THE DRAWINGS

The present invention is described in greater detail below on the basis of embodiments and of the drawings in which.

DETAILED DESCRIPTION

Figure 1:
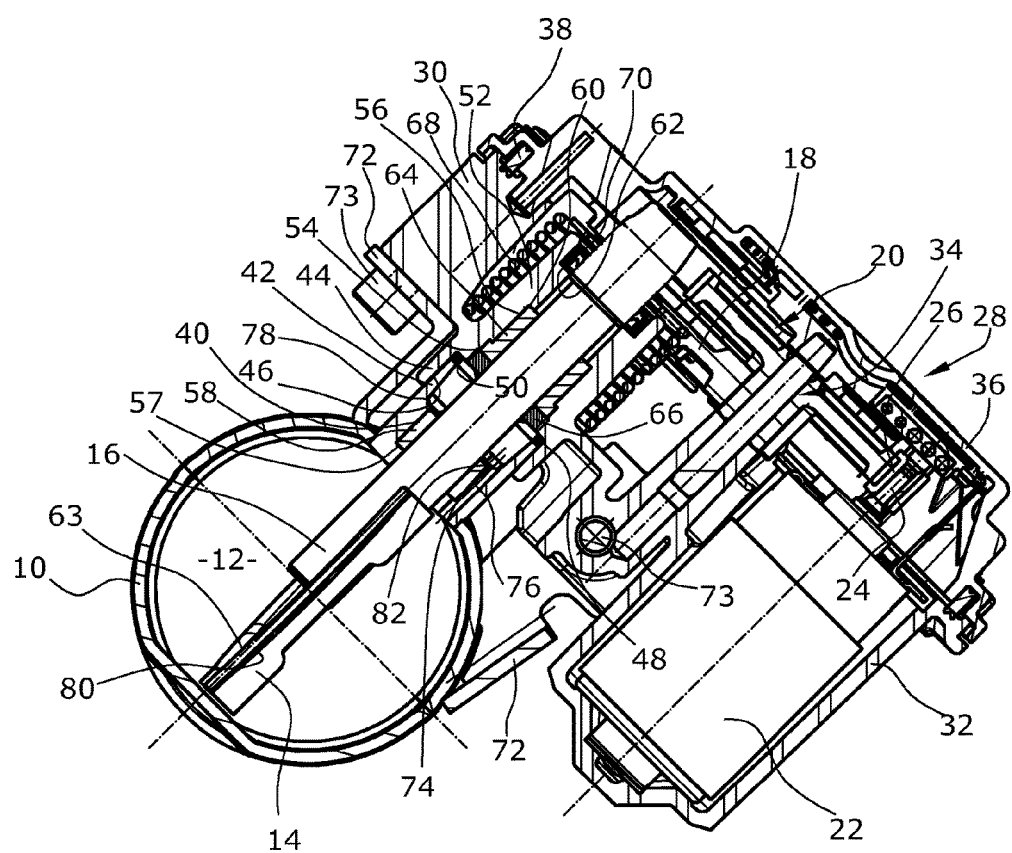
FIG. 1 shows a lateral sectional view of a flap device according to the present invention.
Figure 2:
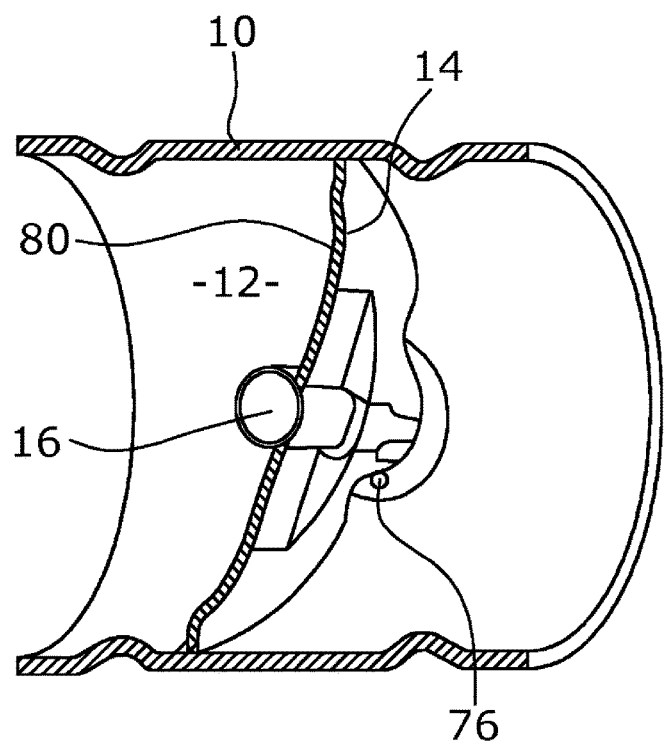
FIG. 2 shows a perspective view of a flow duct of the flap device according to FIG. 1 that is sectioned at the level of the shaft.

Since the shaft extends into the actuator housing and is supported on one side via the first bearing and a second bearing, wherein the first bearing seat is formed on the flow housing, and the chamber from which the bore enters the flow duct is arranged between the first and second bearings, it is rendered possible that condensate which, passing along the shaft, happens to reach the rear side of the first bearing, will be reliably conducted back into the flow duct. It is thereby reliably prevented that the shaft freezes in place after the engine is switched off, thus preventing damage to the bearing which normally is designed as a carbon-graphite bearing. Intrusion farther into the actuator and to the second bearing, respectively, is prevented by the chamber because a pressure drop between the interior of the actuator and the chamber is avoided. Hot exhaust intruding into the chamber is returned into the flow duct in the switched-on state of the internal combustion engine.

In an embodiment of the present invention, the bore can, for example, be formed in the first bearing seat which is formed on the flow housing so that the bearing itself does not have to be processed and can be produced as a completely hollow cylinder. The bore can alternatively be formed in the first bearing. A corresponding flattened portion on a carbon bushing can be formed directly in the molded body.

In an embodiment of the present invention, it is provided that, on the axial end of the first bearing, a step-shaped widened portion can, for example, be formed on the side of the bearing seat opposite to the flow duct and that the bore extends parallel to the shaft from the step-shaped widened portion into the flow duct. The bore can correspondingly be designed as a simple longitudinal bore. The arrangement of the step at the end of the first bearing at the same time provides that no liquid is present within the bearing seat which is in axial abutment on the bearing.

In an embodiment of the present invention, in the assembled state of the flap device, the bore can, for example, be formed in the geodetically lower region of the first bearing seat or of the first bearing. This means that, due to gravity, existing liquids, even smaller quantities of existing liquids, will always reach the bore since the bore is formed at the lowest point of the bearing seat.

In an embodiment of the present invention, in the position of the flap body closing the flow duct, the bore can, for example, be arranged on the downstream side of the flap body. This arrangement results in a pressure difference between the chamber between the two bearings and the end of the bore in the flow duct in the engaged state of the flap body in the flow duct. It is thereby safeguarded that any liquids which may happen to enter the area of the bearing in a partial-load state will be completely led off again via the bore. Intruding hot gases will also be sucked off via the bore, thereby enhancing the thermal stress resistance of the actuator.

In an embodiment of the present invention, the second bearing can, for example, be arranged at a distance from the first bearing in a bearing seat of the actuator housing. A reliable, easily rotatable bearing support of the shaft is thereby provided. The chamber for receiving the condensation water is thus formed between the two housings so that the generating of the bore is simplified.

In an embodiment of the present invention, the flow duct can, for example, extend horizontally and the bore can, for example, be arranged in a plane which is spanned by a vector extending vertically to the central axis of the flow duct and by a vector extending along the shaft axis. The bore can thereby be arranged at the lowermost site even if the flow duct extends horizontally so that water and contamination will be reliably drained.

In an embodiment of the present invention, the flap body can, for example, be formed spherically so that the bore allows for a free flow therethrough in all positions of the flap body, and, in the closed state, is arranged on the downstream side of the bore. The free flow passage through the bore makes it possible, in case of a partial-load state, to make use of the pressure difference at the rear side of the closed flap body in comparison to the chamber between the two bearings, while, in case of a full-load state, the non-existence of pressure differences will have the effect that an intrusion of liquids or hot blow-up gases into the chamber is not expected.

There is thus provided a flap device for an internal combustion engine wherein any liquids passing along the shaft which happen to advance behind the first bearing will reliably be drained into the flow duct. The operational life of the bearings is thus extended, and a freezing and a resultant jamming of the shaft are prevented. Thermal advantages are at the same time also achieved because hot exhaust is conducted back into the duct and not in the direction of the actuator.

An exemplary embodiment of a flap device according to the present invention is shown in the drawings and will be described below.

The flap device according to the invention comprising a flow housing 10 delimiting a flow duct 12. A flap body 14 is arranged within flow duct 12, via which the flow-through cross section of flow duct 12 can be controlled by rotating the flap body 14 in flow duct 12.

For this purpose, flap body 14 is fastened to a shaft 16 extending through flow housing 10 into flow duct 12. On the end opposite to flap body 14, shaft 16 has a driving toothed wheel 18 attached thereto which is part of a gear 20 designed as a spur gear. The gear 20 is driven by an electric motor 22 when the electric motor 22 is suitably powered. A drive pinion 26 is fastened to an output shaft 24 of electric motor 22 therefor, the drive pinion 26 acting as a drive member of gear 20 so that the rotary movement of electric motor 22 will be transmitted, while geared down, via gear 20 to shaft 16 and thus to flap body 14.

Electric motor 22 and gear 20 thus serve as an actuator 28 of the flap device and are arranged in a common actuator housing 30 which includes a main housing portion 32 having the electric motor 22 and the gear 20 mounted therein, and of a lid 36 for closing an actuator interior 34, the lid 36 being fastened to main housing portion 32 with interposition of a sealing 38. For keeping the used constructional space as small as possible and for allowing the electric motor and the gear 20 to be mounted in the main housing portion 32 in a simple manner, the electric motor 22, arranged parallel to shaft 16, extends parallel to shaft 16 in the direction of flow housing 10.

Arranged on flow housing 10 is a first bearing seat 40 in the form of a first hollow cylindrical projection 42 that extends in the direction of a hollow cylindrical seat element 44 on actuator housing 30. The interior of this hollow cylindrical seat element 44 forms a radially limited seat opening 46 into which the first hollow cylindrical projection 42 of flow housing 10 extends, the inner diameter of seat opening 46 substantially corresponding to the outer diameter of hollow cylindrical seat element 44. The axial end of the first hollow cylindrical projection 42 will be shifted against a step-shaped end 48 of seat opening 46 with interposition of an axial sealing 50 in the assembly process.

Hollow cylindrical seat element 44 is followed by a smaller-diametered second hollow cylindrical projection 52 extending into the actuator interior 34 so that a further step 54 is formed between the axially arranged hollow cylindrical seat element 44 and the axially arranged second hollow cylindrical projection 52. The second hollow cylindrical projection 52 of actuator housing 30 serves as a second bearing seat 56.

In the first bearing seat 40 of flow housing 10, there is arranged a first bearing 58, designed as a slide bearing, for shaft 16 the first bearing being 40 made of carbon graphite and being arranged in axial abutment on a wall 57 radially delimiting a shaft passage opening. Shaft 16 extends through first bearing 58 and, beyond the second hollow cylindrical projection 52 projecting into the actuator interior 34, into the actuator interior 34. The second bearing seat 56 comprises a cross-sectional constriction on whose opposite ends steps 60, 62 are respectively formed. The first hollow cylindrical projection 42 the second hollow cylindrical projection 52, the hollow cylindrical seat element 44, and the bearings have a common central axis 63 which is also the shaft axis.

A second bearing 64 is arranged radially within the constricted cross-section, which is again designed as a carbon graphite bearing so that the shaft 16 is supported two times at a flap side. The axial end of the second bearing 64 facing toward flap body 14 extends slightly beyond step 54. It is thereby rendered possible that a thrust washer 66 fixedly arranged on shaft 16 is pressed, via a rotary and pressure spring 68, against the second bearing 64 for axial positional fixation of shaft 16.

The rotary and pressure spring 68 is arranged within the actuator interior 34 while radially surrounding the second hollow cylindrical projection 52, and presses against the driving toothed wheel 18 fixed to shaft 16 so that, together with the toothed wheel, shaft 16 is also pressed in this axial direction. The two end legs of rotary and pressure spring 68 are further engaged in a known manner behind projections (not visible in FIG. 1) on actuator housing 30 and on the driving toothed wheel 18 so that the shaft 16 is biased into one direction at least when rotated out of its rest position. In case electric motor 22 fails, shaft 16 will therefore be pressed into a fail-safe position due to the spring force.

A sealing ring 70 is arranged surrounding shaft 16 on the end of the second hollow cylindrical projection 52 facing into the interior the actuator, the sealing ring 70 being in an axial abutment against step 62 and serving to seal the shaft passage through the second bearing seat 56 in the direction of actuator interior 34.

Attachment of the flow housing on actuator housing 30 is realized via connection plates 72 which, e.g., by welding, are fastened to flow housing 10 and have the actuator housing 30 fastened to it by screws 73.

In operation, i.e., in the running state of the internal combustion engine, exhaust flows through flow duct 12 which contains water and other contamination. Under the effect of the pulsations in the exhaust train, both the water and the contamination will advance along shaft 16 into a chamber 74 between the first bearing 58 and the second bearing 64 and can condensate there particularly after switch-off of the internal combustion engine. This will lead to ice formation in the area of first bearing 58 in case of temperatures of below 0° C., which in turn may result in damage to first bearing 58 or cause the shaft 16 to get stuck.

In order to avoid this, the first hollow cylindrical projection 42 is formed with a bore 76 projecting from chamber 74 into flow duct 12 and extending parallel to shaft 16. To allow this bore 76 to be produced in a particularly simple manner, the first bearing seat 40 is widened in the form of a step-shaped widened portion 78 in the direction of actuator housing 30. The step-shaped widened portion 78 is formed at the level of an axial end 82 of first bearing 58 so that no water can be present within the first hollow cylindrical projection 42 on first bearing 58 if the installation of the flap device in the exhaust train of the internal combustion engine is realized so that the start of said bore 76 is located at the geodetically lowermost position of chamber 74 and the bore 76 continuously descends in the direction toward flow duct 12 so that, due to gravitation, condensation water will always flow out of chamber 74 in the direction of bore 76 and through the latter in the direction of flow duct 12. In order to additionally provide a flow in this direction also in a warm state of the internal combustion engine, i.e., during operation, the bore 76 is located at the downstream side of flap body 14 in the closed state of flap body 14 because, in partial-load operation, i.e., in the closed state of flap body 14, an underpressure will be generated at this site, resulting in a suction effect relative to chamber 74.

Since further installation of this flap device is in most cases performed on a horizontal flow duct 12, the above two conditions can be fulfilled by bore 76 being arranged in a plane which is spanned by a vector extending vertically to the central axis 63 of the flow duct 12 and by a vector extending along the shaft axis. The flap body 14 is also spherically formed so that it has a bulge 80 arranged to the effect that the outer periphery of flap body 14 is inclined toward the upstream side.

In the full-load state, flap body 14 is in a position provided to open the flow duct 12, while, however, only small pressure differences will occur in this position so that the inflow of exhaust along shaft 16 into chamber 74 is merely small and there exist high exhaust temperatures which will prevent condensation of the water in the exhaust.

Because of the chamber 74 between the first bearing 58 and the second bearing 64, pressure differences causing exhaust to flow along shaft 16 into the interior of actuator 28 will be avoided since a pressure reduction takes place via chamber 74.

There is thus provided a flap device wherein damage to the actuator or sticking of the shaft due to freezing water or other contamination are avoided. At the same time, during operation of the internal combustion engine, heat is withdrawn from the chamber between the bearings because the exhaust is sucked from the chamber in the direction of the flow duct. In spite of the direct linkage of the flap shaft in the actuator interior, the actuator will not be thermally overstressed because no hot exhaust will leak into the interior of the actuator due to pressure differences.

It should be clear that the protective scope of the present invention is not restricted to the described exemplary embodiment. The constructional design of the housings, the drives, the gears used, and the duct and flap designs can in particular be varied. Different bearings and sealings can also be used. The bore can also be formed on the bearing itself depending on the respective design of the bearing. Reference should also be had to the appended claims.

What is claimed is:

1. A flap device for an internal combustion engine, the flap device comprising:
   a flow housing configured to delimit a flow duct;
   a shaft configured to rotate, the shaft being supported on one side thereof;
   a flap body attached to the shaft in the flow duct;
   an actuator configured to rotate the shaft and thereby the flap body in the flow duct;
   an actuator housing configured to have the actuator be arranged therein;
   a first bearing seat formed on the flow housing;
   a first bearing arranged in the first bearing seat so as to radially surround the shaft;
   a second bearing;
   a chamber configured to surround the shaft;
   a bore arranged to open into the flow duct from the chamber;
   wherein,
   the shaft is configured to protrude into the actuator housing,
   the shaft is supported on the one side via the first bearing and via the second bearing, and
   the chamber from which the bore opens into the flow duct is arranged axially between the first bearing and the second bearing.

2. The flap device as recited in claim 1, wherein the bore is formed in the first bearing.

3. The flap device as recited in claim 1, wherein the bore is formed in the first bearing seat.

4. The flap device as recited in claim 3, wherein the first bearing comprises a step-shaped widened portion on an axial end thereof, the step-shaped widened portion being formed on a side of the first bearing seat which is opposite to the flow duct so that the bore extends parallel to the shaft from the step-shaped widened portion into the flow duct.

5. The flap device as recited in claim 3, wherein, in an assembled state of the flap device, the bore is formed in a geodetically lower region of the first bearing seat or in a geodetically lower region of the first bearing.

6. The flap device as recited in claim 1, wherein the bore is arranged on a downstream side of the flap body when the flap body is arranged to close the flow duct.

7. The flap device as recited in claim 1, further comprising:
   a second bearing seat formed on the actuator housing;
   the second bearing is arranged at a distance from the first bearing in the second bearing seat.

8. The flap device as recited in claim 1, wherein,
   the flow duct comprises a central axis,
   the shaft comprises a shaft axis,
   the flow duct is configured to extend horizontally, and
   the bore is arranged in a plane which is spanned by a first vector extending vertically to the central axis of the flow duct and by a second vector extending along the shaft axis of the shaft.

9. The flap device as recited in claim 1, wherein the flap body is formed spherically so that the bore allows for a free flow therethrough in all positions of the flap body, and, in a closed state of the flap body, the bore is arranged on a downstream side of the flap body.

\* \* \* \* \*